United States Patent [19]

Nilsson

[11] 4,006,856
[45] Feb. 8, 1977

[54] ARRANGEMENT FOR UTILIZING SOLAR ENERGY FOR HEATING BUILDINGS

[75] Inventor: Karl N. A. Nilsson, Stockholm, Sweden

[73] Assignee: Aktiebolaget Svenska Flaktfabriken, Nacka, Sweden

[22] Filed: Mar. 14, 1975

[21] Appl. No.: 558,207

[30] Foreign Application Priority Data

Mar. 27, 1974 Sweden ............................ 7404085

[52] U.S. Cl. ............................... 237/1 A; 126/270; 98/31

[51] Int. Cl.² ............................................ F24J 3/02

[58] Field of Search ........... 126/270, 271; 237/1 A; 98/31; 415/219 B

[56] References Cited

UNITED STATES PATENTS

| 2,484,127 | 10/1949 | Stelzer | 126/270 X |
|---|---|---|---|
| 2,559,869 | 7/1951 | Gay | 126/270 X |
| 2,559,871 | 7/1951 | Gay | 126/270 X |
| 2,680,565 | 6/1954 | Lof | 126/271 X |
| 3,048,094 | 8/1962 | Bailey | 98/31 X |
| 3,236,294 | 2/1966 | Thomason | 126/271 X |

FOREIGN PATENTS OR APPLICATIONS

| 1,373,013 | 3/1963 | France | 415/219 B |
|---|---|---|---|

Primary Examiner—William E. Wayner
Assistant Examiner—William E. Tapolcai, Jr.
Attorney, Agent, or Firm—Howson and Howson

[57] ABSTRACT

An arrangement utilizing solar energy for heating a building having channel spaces in the roof, the outer walls, and the floor, all mutually communicating in series with each other in at least one cross-section of said building and being sealed toward the surrounding atmosphere, a preferably plane solar heat absorbing body being located in one or more of the channel spaces, which channels extend in the circulation path of the air stream along such a body, and a separate channel space including a heat-accumulating magazine.

6 Claims, 2 Drawing Figures

U.S. Patent  Feb. 8, 1977  4,006,856
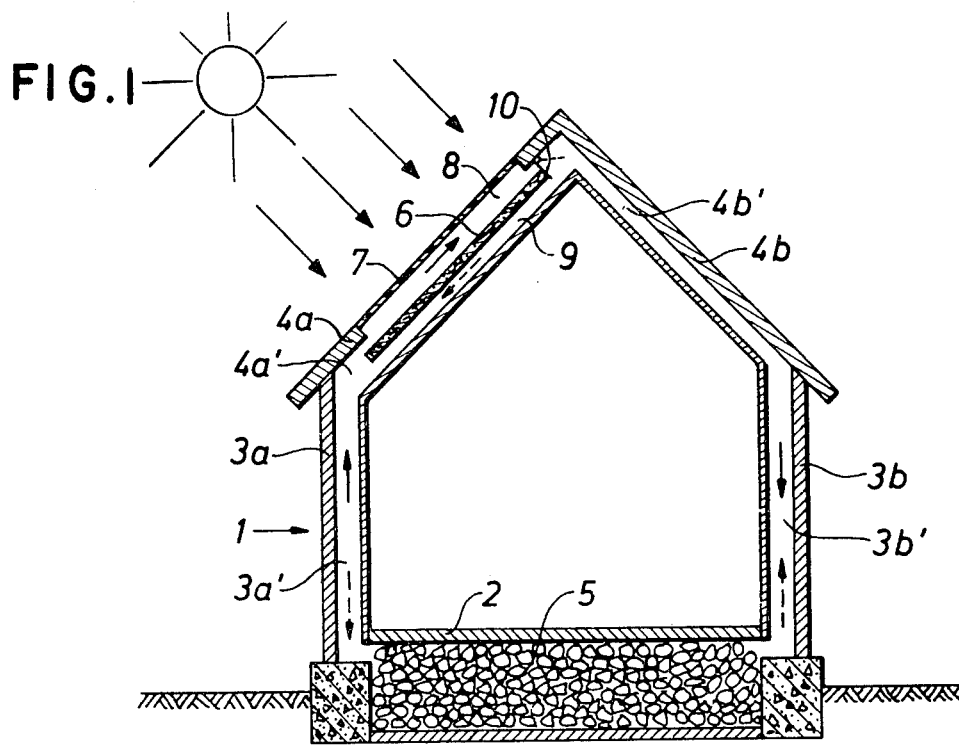
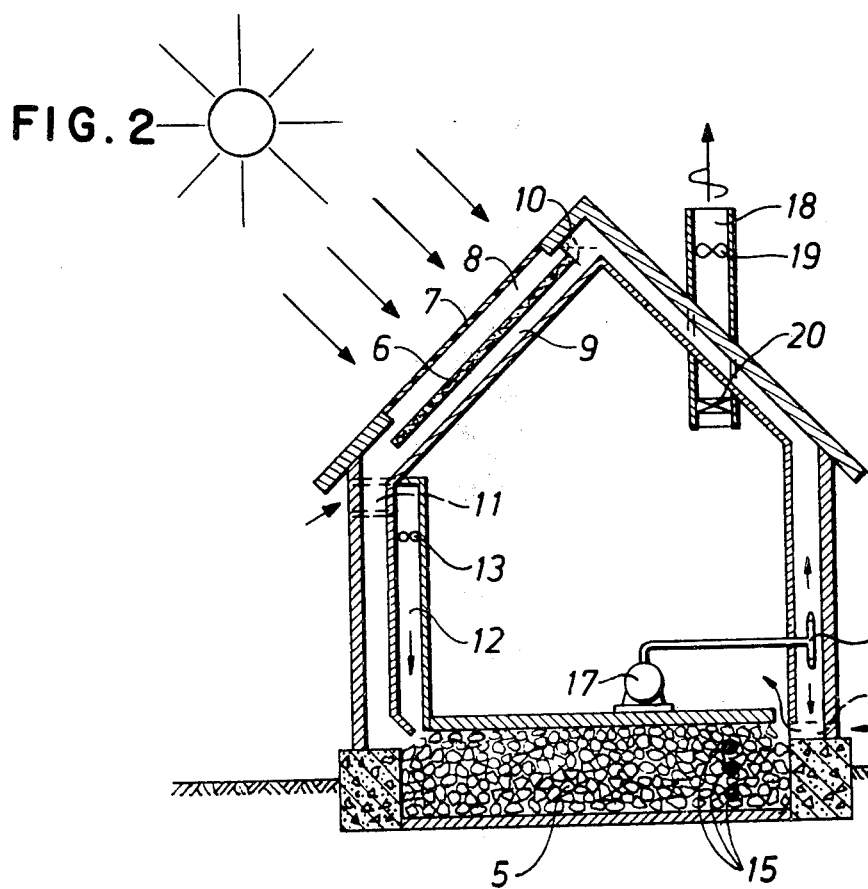

ARRANGEMENT FOR UTILIZING SOLAR ENERGY FOR HEATING BUILDINGS

This invention relates to an arrangement for use in the utilization of solar energy for the heating of a building comprising a number of preferably plane building parts in the form of floor, outer walls and roof and enclosing a number of rooms.

Arrangements for the utilization of solar energy are previously known. According to one known arrangement, solar energy is converted first to electricity by means of solar cells of the kind developed for space technology. It was found, however, that the exchange takes place with a low degree of efficiency, and that, moreover, such solar cells are very expensive to manufacture. In another known arrangement, photochemical reactions are utilized for long-time storage of solar energy, and in one known case the roof of the building consists of glass plates with an intermediate black metal coat. The collected heat is conducted by water or glycol to a tank through pipes, which are laid between said plates. Several of such known arrangements for heating purposes — e.g. those using a water pump, in such a manner, that water is heated in a solar energy receiver and passed through a boiler with butane in liquid state, which is evaporated whereafter the gas drives a motor — require such special and expensive equipment that they, unfortunately, are not suitable for mass production by ordinary house manufacturers. Such production would be desirable in view of the more general utilization of reliable and low-priced arrangements. The invention is directed to an arrangement which is inexpensive both from a mounting and operation point of view and intended to be used more generally for the heating of conventional buildings by utilization of solar energy. The arrangement according to the invention is characterized primarily in that the floor, outer walls and roof of the building are constructed so as with each other to form channel spaces which communicate relative to each other and are sealed toward the surrounding atmosphere, in such a manner that they form in at least one cross-section of the building a closed channel system for an air stream circulating therein, that in one or more channel spaces a preferably plane solar heat absorbing body is located, which channel space enclosing said body is provided with at least one passageway extending in the circulation path of the air stream along said body, that the channel space(s) and/or the body are covered by a layer of a material pervious to solar energy in the form of heat rays, and that said closed channel system also includes, separated from said channel space, a separate channel space, which includes a heat-accumulating magazine passed by the circulating air stream. An expedient embodiment of the arrangement is characterized in that the channel space including the solar heat absorbing body is covered by one or more layers of a material preventing heat reflection from the body.

Another advantageous embodiment of the arrangement is characterized in that in the channel space including the solar head absorbing body is mounted a check valve located in the flow path of the circulating air stream for substantially reducing the air flow through said passage when solar heat radiation is absent or strongly reduced. A preferred embodiment of the arrangement is characterized in that the solar heat absorbing body is thinner than the respective channel space and so designed and attached in said channel space at some distance from the air-tight layer covering the channel space, that two channels are formed, viz. one channel in front of the body, i.e. between the body and the layer, and a second channel in the form of a by-pass behind the body, and that the first-mentioned channel is equipped with said automatic check valve. A further developed embodiment of the arrangement is characterized in that it comprises a plurality of jet nozzles, which are connected to a fan, air pump or compressor and mounted in one or more of the communicating channel spaces for supplying so-called jet drafts in alternative directions opposed to each other to guide the circulating air stream and increase the closed circuit through the channel space and magazine. In the aforesaid separate channel space, i.e. the magazine, electric heating cables may suitably be attached preferably at the inlet end of the magazine for the circulating air stream. The invention also comprises an embodiment of the arrangement for a building equipped with means for mechanical ventilation. This embodiment is characterized in that the means for provision of supply air and spent air, i.e. ventilation air, consists of fans, which are mounted preferably in a separate duct connected to the outer air and conducting said supply air via the magazine through a supply air opening to the interior of the room(s), and the means for carrying spent air from the interior of the room(s) consist of a corresponding spent air duct in connection with ambient outer air and equipped with a spent air fan.

The invention is described in the following in greater detail, with reference to the accompanying drawings, in which FIG. 1 shows a cross-section of a building with the basic structural design, comprising the closed channel system, the solar energy absorbing body and the heat accumulating magazine, and FIG. 2 shows a corresponding cross-section of the building, which is equipped with means for mechanic ventilation and jet nozzles connected to a compression air source for guiding and increasing the circulation in the closed circuit.

In the drawing, 1 designates the building, 2 designates its floor, and 3a, 3b designate the outer walls. 4a and 4b designate a roof facing to the south and, respectively, a roof facing to the north. The channel spaces in the outer walls are designated by 3a' and 3b'. Corresponding spaces in the roof are designated by 4a' and 4b'. The designation 5 stands for a magazine, i.e. a channel space beneath the floor 2 and located, from the viewpoint of air flow, in a part of the closed channel system which lies substantially directly in front of 4a'. 6 designates a solar heat absorbing body, and 7 designates a layer which air-tightly covers the channel space 4a' and constitutes a part of the roof surface 4a in the embodiment shown. 8 designates a channel in front of the body 6, i.e. between the body and the layer 7, and 9 designates a corresponding channel behind the body, which channel is a by-pass. 10 designates a check valve, which according to the invention is intended to substantially reduce and brake the air stream through the channel 8 upon absent or strongly reduced heat radiation of the body 6. In such an occasion the temperature of the forward surface of the body 6 decreases while the rearward surface of the body will show a lower temperature first after a longer period of absence of solar heat radiation. According to the invention, the self-circulation through the channel 8 is caused to substantially cease by means of the check valve 10 when closed and, instead, the self-circulating air stream is then caused to pass through the aforesaid by-pass. 11 designates a supply air opening for ventilation air to the interior of the room(s) from the atmosphere, and 12 and 13 designate a duct and, respectively, a fan for the supply air supplied through a supply air opening 14 to the interior of the room(s). The corresponding spent air duct and spent air fan are designated by 18 and, respectively, 19. The spent air fan, of course, may in known manner be equipped with a heat exchanger, which is designated by 20. 15 designates electric heat cables, which preferably are intended for operation during the low-load periods (at night-tariff), 16 designates jet nozzles connected to a fan, air pump or compressor 17. By means of the jet drafts supplied through said jet nozzles it is possible to ensure by simple means guidance of the air stream, which circulates or, at special operation cases, is reversed, and to bring about an optimum increase of the closed circuit through the different channel spaces and the magazine 5.

I claim:

1. In a building structure provided with solar heating means, comprising a solar heat-exchange chamber and air-circulating channel means extending between opposite ends of said heat-exchange chamber and communicating therewith to form a closed air-circulation loop about at least a portion of said building structure, said solar heat-exchange channel comprising a light-pervious front panel exposed to solar light and solar light-absorbing means positioned to receive solar light by way of said front panel and to convert a substantial portion of said light to heat, the improvement comprising:

means mounting said light-absorbing means to divide said heat-exhange chamber into a front channel extending between said light-absorbing means and said light-pervious front panel, and a rear by-pass channel extending between said light-absorbing means and a rear wall of said heat-exchange chamber; and air-flow responsive check valve means associated with said front channel for automatically reducing the air flow through said front channel when the solar heat-producing radiations reaching said solar light absorbing means are strongly reduced or absent, and for permitting said air flow to increase when said radiation increases.

2. The structure of claim 1, wherein said check valve means is biased toward a closed position in which said air flow is reduced, and is responsive to air flow through said front channel in only one direction to be opened.

3. The structure of claim 2, wherein said front channel slopes upwardly and said check valve means is pivotably mounted at the higher end of said front channel substantially to close off said front channel at low rates of air flow from said front channel, thereby to divert air flow from said air-circulating channel means through said rear by-pass channel.

4. The structure of claim 1, comprising a plurality of jet nozzles mounted in said air-circulating channel means and means supplying said nozzles with air under pressure, said nozzles being oriented in opposite directions to control the direction and speed of air circulating in said air-circulating channel means.

5. The structure of claim 1, comprising a heat magazine in heat-exchange relation with air in said air-circulating channel means for storing heat supplied thereto, and electric heater means in said magazine adjacent one end thereof.

6. The structure of claim 1, comprising fresh-air fan means and associated inlet duct means for introducing fresh air into the room space in said building, and spent air fan means and associated outlet duct means for venting spent air from said room space; said structure comprising heat-storing magazine means said fresh air duct means serving to deliver said fresh air to said room space by way of said magazine means.

* * * * *